United States Patent
Mishima

(10) Patent No.: US 8,562,465 B2
(45) Date of Patent: Oct. 22, 2013

(54) CLIP-TYPE TENSIONER

(75) Inventor: Kunihiko Mishima, Nabari (JP)

(73) Assignee: BorgWarner Morse TEC Japan K.K., Nabari (JP)

( * ) Notice: Subject to any disclaimer, the term of this patent is extended or adjusted under 35 U.S.C. 154(b) by 369 days.

(21) Appl. No.: 13/003,797

(22) PCT Filed: Jul. 13, 2009

(86) PCT No.: PCT/US2009/050350
§ 371 (c)(1),
(2), (4) Date: Jan. 12, 2011

(87) PCT Pub. No.: WO2010/011512
PCT Pub. Date: Jan. 28, 2010

(65) Prior Publication Data
US 2011/0111898 A1    May 12, 2011

(30) Foreign Application Priority Data
Jul. 22, 2008   (JP) .................. 2008-188402

(51) Int. Cl.
*F16H 7/08* (2006.01)
(52) U.S. Cl.
USPC .......................................... 474/101
(58) Field of Classification Search
USPC ......................... 474/135, 110, 101
See application file for complete search history.

(56) References Cited

U.S. PATENT DOCUMENTS

| | | | |
|---|---|---|---|
| 4,772,251 A * | 9/1988 | Goppelt et al. | 474/101 |
| 5,704,860 A * | 1/1998 | Stief | 474/110 |
| 5,931,754 A * | 8/1999 | Stief et al. | 474/109 |
| 6,120,402 A * | 9/2000 | Preston et al. | 474/109 |
| 7,189,174 B2 * | 3/2007 | Yamamoto et al. | 474/109 |
| 7,571,632 B2 * | 8/2009 | Yamamoto et al. | 72/370.21 |
| 7,775,921 B2 * | 8/2010 | Izutsu et al. | 474/110 |
| 8,277,347 B2 * | 10/2012 | Barrette et al. | 474/101 |
| 2002/0094894 A1 * | 7/2002 | Poiret et al. | 474/101 |
| 2004/0138018 A1 * | 7/2004 | Hayakawa et al. | 474/122 |
| 2004/0266571 A1 * | 12/2004 | Izutsu et al. | 474/110 |
| 2005/0049093 A1 * | 3/2005 | Sato et al. | 474/101 |
| 2006/0003859 A1 * | 1/2006 | Sato et al. | 474/110 |
| 2006/0281595 A1 * | 12/2006 | Narita et al. | 474/109 |
| 2010/0222167 A1 * | 9/2010 | Chekansky et al. | 474/110 |

FOREIGN PATENT DOCUMENTS

| | | |
|---|---|---|
| JP | 09-512884 | 12/1997 |
| JP | 11-311337 | 11/1999 |
| KR | 2007-0034722 | 3/2007 |

* cited by examiner

*Primary Examiner* — William A Rivera
*Assistant Examiner* — Michael Riegelman

(57) ABSTRACT

A clip-type tensioner member having a piston in a housing and a ratchet mechanism. A plurality of rack teeth are formed on the outer periphery of the pistons. A clip member elastically engages with the rack teeth and is positioned in a recess in the housing. The points of contact of the clip member on the housing are different in the retracted and engaged positions.

7 Claims, 4 Drawing Sheets

CLIP-TYPE TENSIONER

TECHNICAL FIELD

The present invention relates to a tensioner for producing tension in a chain, and more specifically to a clip-type tensioner having a ratchet mechanism.

BACKGROUND OF THE INVENTION

Clip-type tensioners, as they are known, have been used in the past as chain tensioners. A clip-type tensioner consists of a housing, a piston which is slidably supported in a hole of the housing, a spring for urging the piston so as to protrude from the hole, and a ratchet mechanism. The ratchet mechanism has a number of rack teeth on the outer periphery of the piston, a clip which engages with the rack teeth, and a recess on the inner peripheral surface of the housing. One example is shown in FIG. 1 of Japanese Unexamined Patent Application Publication 2005-98420. The recess on the inner peripheral surface of the housing has a first face which comes into contact with the clip when the piston advances, allowing the piston to advance, and a second face which comes into contact with the clip when the piston retracts, thereby holding the clip between the rack teeth and restricting retraction of the piston.

When slack is produced in the chain during operation, the piston advances toward the chain under the elastic repelling force of the spring and protrudes outside the housing. The clip which has engaged with the rack teeth on the outer periphery of the piston comes into contact with the first face of the recess at this point, which means that the piston is allowed to advance. On the other hand, when tension in the chain increases, the excessive pressing force from the chain causes the piston to retract, pushing it into the housing. The clip which has engaged with the rack teeth on the outer periphery of the piston comes into contact with the second face of the recess at this point, which means that retraction of the piston is restricted.

However, with the conventional clip-type tensioner described above, when the piston is pushed into the housing, the clip always makes contact at the same position on the second face on the inner peripheral surface of the housing. Consequently, the place on the second face where the clip makes contact becomes worn with repeated usage.

SUMMARY OF THE INVENTION

The present invention has been devised in view of the situation outlined above, and the issue addressed by the present invention lies in providing a clip-type tensioner with which wear can be reduced to lengthen the lifespan.

The clip tensioner according to a preferred embodiment of the invention is provided with: a housing in which a hole is formed which is open at one end; a piston which can move in and out of the hole; and a spring which urges the piston so as to protrude from the hole. The ratchet mechanism consists of: a number of rack teeth comprising first and second rack teeth, which are formed on the outer periphery of the piston; a clip having a circular portion whereof the diameter can be enlarged, which elastically engages with the rack teeth in a diametric direction; and a recess provided in the housing. The recess has a first face which comes into contact with the clip when the piston advances, allowing the piston to advance, and a second face which comes into contact with the clip when the piston retracts, thereby holding the clip between the rack teeth and restricting retraction of the piston. The position on the second face of the recess where the clip makes contact when the piston has retracted with the clip in a state of engagement with the first rack teeth, is different than the position on the second face of the recess where the clip makes contact when the piston has retracted with the clip in a state of engagement with the second rack teeth.

When slack is produced in the chain during operation, the piston advances under the elastic repelling force of the spring and protrudes outside the housing. The clip which has engaged with the rack teeth on the outer periphery of the piston comes into contact with the first face of the recess in the housing at this point, which means that the piston is allowed to advance. On the other hand, when tension in the chain increases, the excessive pressing force from the chain causes the piston to retract, pushing it into the housing. The clip which has engaged with the rack teeth on the outer periphery of the piston comes into contact with the second face of the recess in the housing at this point, which means that retraction of the piston is restricted.

Preferably, in this case, when prolonged operation of the chain causes wear which leads to slackness and the rack teeth of the piston where the clip engages shift from the first rack teeth to the second rack teeth, the position of the point of contact on the second face of the recess where the clip makes contact when the piston retracts changes. This means that it is possible to avoid the clip always making contact with the same position on the second face, thereby reducing wear, as a result of which the lifespan of the tensioner can be improved. It is unnecessary to select special materials or to carry out special heat treatment in order to improve the wear resistance of the second face of the recess, which makes it possible to inexpensively reduce the wear on the second face.

The first rack teeth have a first shape, and the second rack teeth have a second shape which is different than the first shape. The first and second rack teeth have a different shape, so the position on the second face of the recess where the clip makes contact when the piston has retracted with the clip in a state of engagement with the first rack teeth, is different than the position on the second face of the recess where the clip makes contact when the piston has retracted with the clip in a state of engagement with the second rack teeth.

The diameter of the bottom of the second rack teeth where the clip is seated can be smaller than the diameter of the bottom of the first rack teeth where the clip is seated.

The position on the second face of the recess where the clip makes contact when the piston has retracted with the clip in a state of engagement with the second rack teeth shifts radially inward on the second face from the position on the second face of the recess where the clip makes contact when the piston has retracted with the clip in a state of engagement with the first rack teeth. In this case, the second shape may be different than the first shape or be similar to the first shape.

The first rack teeth can be formed toward the front end of the piston, and the second rack teeth are formed toward the rear end of the abovementioned piston. When slack is produced in the chain and the piston advances, the clip moves from the first rack teeth to the second rack teeth of the piston.

The first rack teeth can also be formed toward the rear end of the piston, and the second rack teeth are formed toward the front end of the piston. When slack is produced in the chain and the piston advances, the clip moves from the second rack teeth to the first rack teeth of the piston.

The rack teeth also can comprise third rack teeth, and the position on the second face of the recess where the clip makes contact when the piston has retracted with the clip in a state of engagement with the third rack teeth, is different than the position on the second face of the recess where the clip makes contact when the piston has retracted with the clip in a state of engagement with the first and second rack teeth.

In this case, when slack is produced in the chain, the position of the point of contact on the second face of the recess where the clip makes contact when the piston retracts changes not only if the rack teeth of the piston where the clip engages shift from the first rack teeth to the second rack teeth, but also if they shift from the second rack teeth to the third rack teeth. This makes it possible to further reduce wear on the second face of the recess, and as a result the lifespan of the tensioner can be further improved.

A cylinder which is open at one end is provided in the hole of the housing, and the piston is slidably supported in the cylinder, with the recess being formed on the inner peripheral surface of the cylinder.

With the clip-type tensioner according to a preferred embodiment of the present invention, when prolonged operation of the chain causes slackness which makes the rack teeth of the piston where the clip engages shift from the first rack teeth to the second rack teeth, the position of the point of contact on the second face of the recess where the clip makes contact when the piston retracts changes, and therefore it is possible to reduce wear on the second face of the recess, and the lifespan of the tensioner can be improved.

DESCRIPTION OF THE PREFERRED EMBODIMENTS

Figure 1:
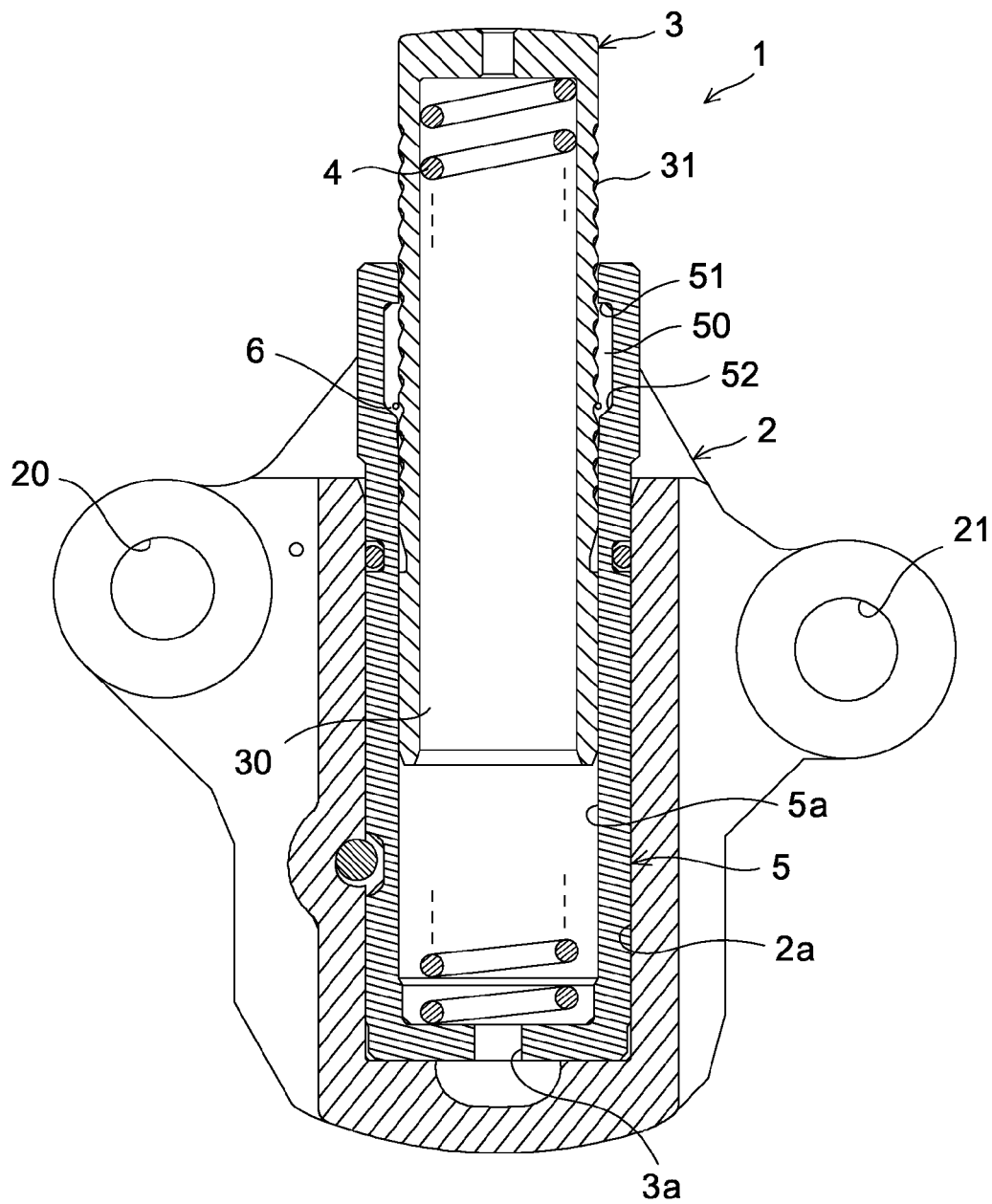
FIG. 1 is a view in longitudinal section of the clip-type tensioner according to an exemplary embodiment of the present invention.
Figure 2:
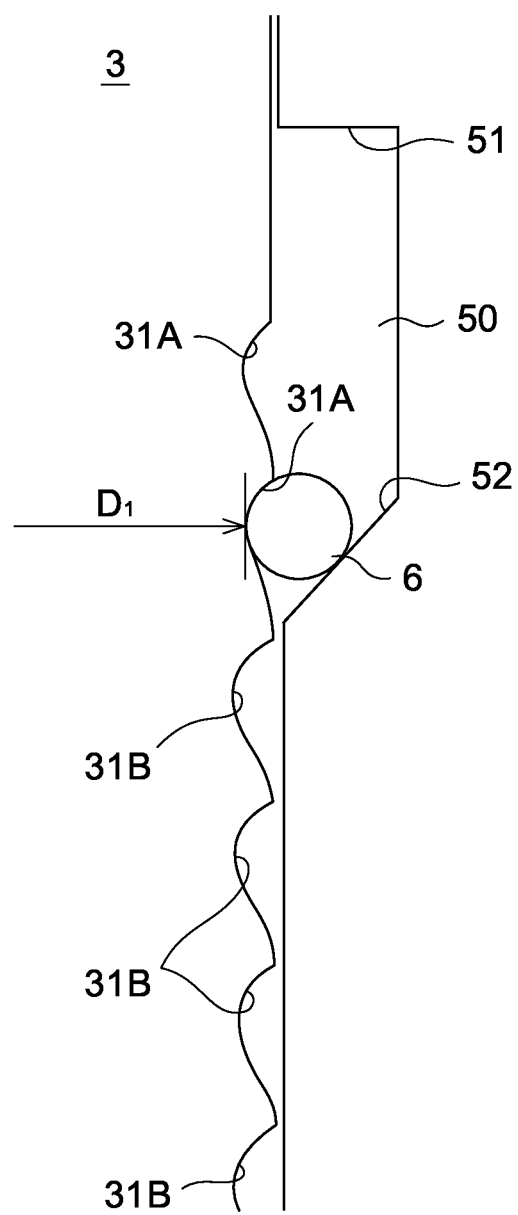
FIG. 2 shows an enlargement of some of the rack teeth of the piston and illustrates the operational effects of this exemplary embodiment.
Figure 3:
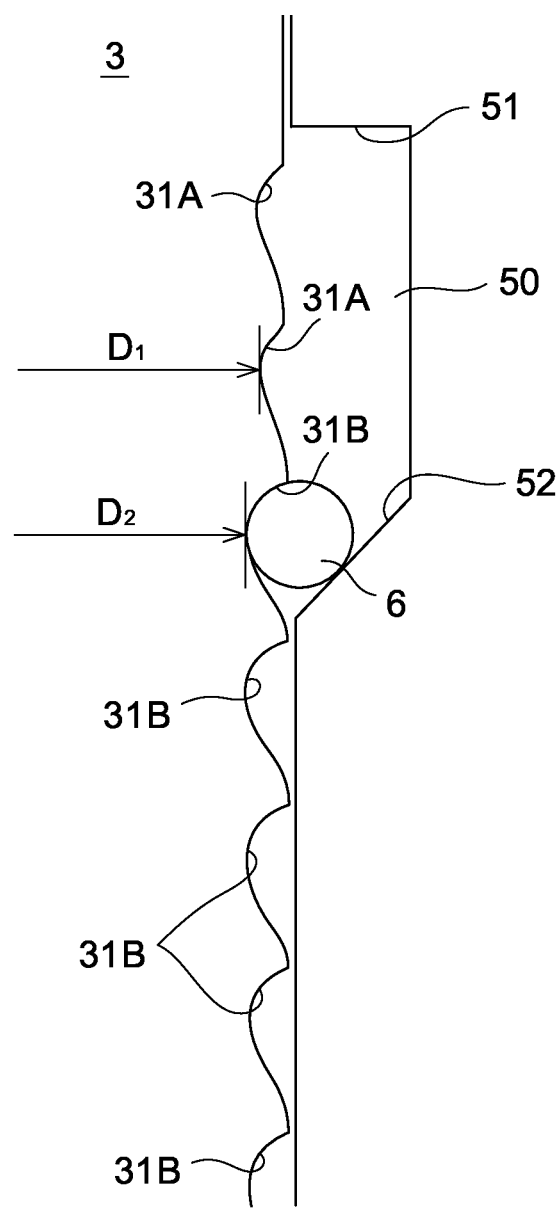
FIG. 3 shows an enlargement of some of the rack teeth of the piston and illustrates the operational effects of this exemplary embodiment.
Figure 4:
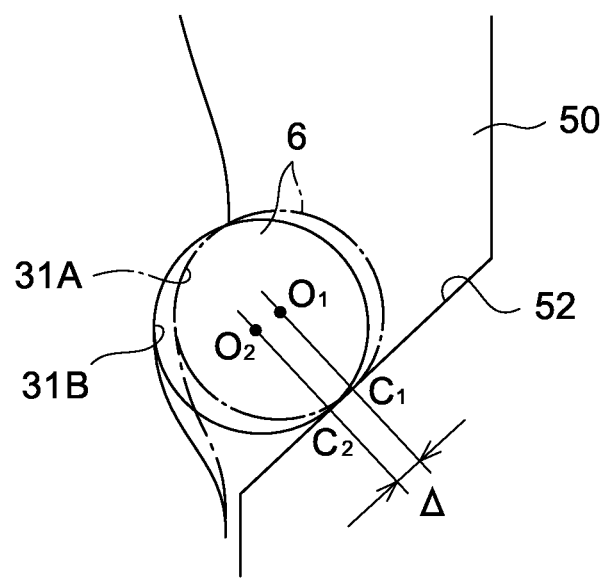
FIG. 4 shows an enlargement of some of the rack teeth of the piston and illustrates the operational effects of this exemplary embodiment.

FIGS. 1 to 4 illustrate a clip-type tensioner according to an exemplary embodiment of the present invention, where FIG. 1 is a view in longitudinal section of the clip-type tensioner according to this exemplary embodiment, and FIGS. 2 to 4 show enlargements of some of the rack teeth of the piston. The figures illustrate the operational effects of this exemplary embodiment.

As shown in FIG. 1, a clip-type tensioner 1 has: a housing 2 in which is formed a hole 2a which is open at one end; a hollow piston 3 which is provided so as to be able to move in and out of the hole 2a of the housing 2; and a spring 4 for urging the piston 3 so as to protrude from the hole 2a (only part of this spring is depicted). A cylinder 5 in which is formed a hole 5a which is open at one end is press-fitted into the hole 2a of the housing 2, and the piston 3 is slidably supported in the hole 5a of the cylinder 5.

An oil passage 3a for supplying the oil from a hydraulic pressure supply source (not depicted) to a chamber 30 which is formed by the space inside the piston 3 and the cylinder 5 is formed at the bottom of the cylinder 5. Furthermore, screw holes 20, 21 into which mounting screws for mounting the tensioner 1 are inserted are provided on the housing 2.

A number of rack teeth 31 are formed on the outer periphery of the piston 3. A clip 6 having a circular portion whereof the diameter can be enlarged, which elastically engages with the rack teeth 31 in a diametric direction is fitted on the rack teeth 31. A recess 50 is formed on the inner peripheral surface at the upper part of the cylinder 5, the recess 50 having a first face 51 formed at the top end, and a second face 52 formed at the bottom end. The clip 6 is placed inside the recess 50 in the cylinder 5.

As shown in FIGS. 2 and 3, the rack teeth 31 comprise a number of first rack teeth 31A which are formed toward the front end of the piston 3 (toward the top in the figures), and a number of second rack teeth 31B which are formed toward the rear end of the piston 3 (toward the bottom in the figures), i.e. behind the first rack teeth 31A, and which have a different shape than the first rack teeth 31A. Each of the rack teeth 31 has a bottom part of maximum depth which is formed at a position toward the front end of the piston, and a gently inclined face which is a continuation of the bottom part and is formed at a position toward the rear end of the piston. The clip 6 is seated in the bottom part of the rack teeth 31A, 31B.

In this example, the first rack teeth 31A are positioned at the very top and in second place, counting from the front end of the piston 3, while the second rack teeth 31B are positioned in third place and after, counting from the front end of the piston 3. If the diameter of the bottom part of the first rack teeth 31A is $D_1$ and the diameter of the bottom part of the second rack teeth 31B is $D_2$, then $D_2 < D_1$. That is to say, in this case, the bottom part of the second rack teeth 31B is at a deeper position than the bottom part of the first rack teeth 31A in other words positioned further inward in the radial direction.

The recess 50 has the first face 51 which is formed toward the front end of the piston, and the second face 52 which is formed toward the rear end of the piston. The first end 51 extends substantially perpendicular to the axis of the piston, while the second face 52 extends obliquely to the axis of the piston.

When the piston 3 advances with the clip 6 fitted in the rack teeth 31 of the piston 3, the first face 51 is in contact with the clip 6, allowing the piston 3 to advance; when the piston 3 retracts with the clip 6 fitted in the rack teeth 31 of the piston 3, the second face 52 is in contact with the clip 6 which is held between the rack teeth 31 so that retraction of the piston 3 is restricted. The ratchet mechanism consists of the rack teeth 31, the first and second faces 51, 52, and the clip 6.

The operational effects of this exemplary embodiment will be described next.

First of all, when slack is produced in the chain during operation, the piston 3 advances under the elastic repelling force of the spring 4 and protrudes from the hole 5a in the cylinder 5, while the clip 6 which has engaged with the rack teeth 31 on the outer periphery of the piston moves together with the piston 3. At this point, if there is a large amount of movement of the piston 3, the clip 6 comes into contact with the first face 51 of the recess 50 in the cylinder 5 and only the piston 3 advances from this state. The piston 3 advancing in this way causes the clip 6 to move steadily to the rack teeth 31 toward the rear end of the piston.

Next, when the tension in the chain increases during operation, the excessive pressing force from the chain causes the piston 3 to retract, pushing it into the hole 5a in the cylinder 5, and the clip 6 which has engaged with the rack teeth 31 on the outer periphery of the piston moves together with the piston 3. Then, when the clip 6 which has engaged with the rack teeth 31 on the outer periphery of the piston comes into contact with the second face 52 of the recess 50 in the cylinder 5, the clip 6 is held between the rack teeth 31 and the second face 52 (see FIGS. 2 and 3), whereby retraction of the piston 3 is restricted.

FIG. 2 shows the situation when the clip 6 is in contact with the second face 52 and in a state of engagement with the first rack teeth 31A of the piston 3, and FIG. 3 shows the situation when the clip 6 is in contact with the second face 52 and in a state of engagement with the second rack teeth 31B of the piston 3.

FIGS. 2 and 3 are shown here in a single drawing which is FIG. 4. In FIG. 4, the single dot chain line shows the situation in FIG. 2, while the solid line shows the situation in FIG. 3. Furthermore, the center of the clip 6 in FIG. 2 is denoted by $O_1$, and the center of the clip 6 in FIG. 3 is denoted by $O_2$.

As shown in FIG. 4, the position of a point of contact $C_1$ on the second face 52 of the recess 50 where the clip 6 makes contact when the piston 3 has retracted with the clip 6 in a state of engagement with the first rack teeth 31A, is different than the position of a point of contact $C_2$ on the second face 52 of the recess 50 where the clip 6 makes contact when the piston 3 has retracted with the clip 6 in a state of engagement with the second rack teeth 31B. That is to say the point of contact $C_2$ shifts downward from the point of contact $C_1$ along the second face 52 by $\Delta$.

This means that it is possible to avoid the clip 6 always making contact with the same position on the second face 52 of the recess 50, and it is possible to reduce wear on the second face 52 of the recess 50. As a result, the lifespan of the tensioner can be improved. Furthermore, in this case, it is unnecessary to select special materials or to carry out special heat treatment in order to improve the wear resistance of the second face 52 of the recess 50, which makes it possible to inexpensively reduce the wear on the second face 52 of the recess.

It should be noted that the exemplary embodiment described above illustrates an example in which the first rack teeth 31A are formed toward the front end of the piston and the second rack teeth 31B are formed toward the rear end of the piston, but the present invention can be applied in the same way if, conversely, the first rack teeth 31A are formed toward the rear end of the piston and the second rack teeth 31B are formed toward the front end of the piston. In this case, the first rack teeth 31A whereof the bottom part has a large diameter are positioned toward the rear end of the piston, so even if the clip 6 relaxes during prolonged operation of the tensioner, the clip 6 can elastically deform as it shifts from the second rack teeth to the first rack teeth, and the clip 6 can be elastically held in the first rack teeth.

Furthermore, the exemplary embodiment described above illustrates an example in which the second rack teeth 31B have a different shape to the first rack teeth 31A, but the second rack teeth 31B may have the same shape as the first rack teeth 31A (that is a similar shape), but with a different size.

In addition, the exemplary embodiment described above illustrates an example in which the rack teeth 31 comprise first and second rack teeth 31A, 31B, but the present invention can be applied in the same way if the rack teeth 31 also comprise third rack teeth. In this case, the position of the point of contact on the second face 52 of the recess 50 where the clip 6 makes contact when the piston 3 has retracted with the clip 6 in a state of engagement with the third rack teeth, is different than the position of the points of contact $C_1$, $C_2$ on the second face 52 of the recess 50 where the clip 6 makes contact when the piston 3 has retracted with the clip 6 in a state of engagement with the first and second rack teeth 31A, 31B.

In this case, when slack is produced in the chain, the position of the point of contact on the second face 52 of the recess 50 where the clip 6 makes contact when the piston retracts changes not only if the rack teeth 31 of the piston 3 where the clip 6 engages shift from the first rack teeth 31A to the second rack teeth 31B, but also if they shift from the second rack teeth 31B to the third rack teeth. This makes it possible to further reduce wear on the second face 52 of the recess 50, and as a result the lifespan of the tensioner can be further improved.

The exemplary embodiment described above illustrates an example in which the piston 3 is provided so as to be able to move in and out of the housing 2, with the cylinder 5 interposed, but the cylinder 5 need not be present. In this case, the piston 3 is slidably supported in the hole formed in the housing 2.

While the invention described in connection with various embodiments, it will be understood that the invention is not limited to those embodiments. On the contrary, the invention covers all alternatives, modifications, and equivalents as may be included within the spirit and scope of the appended claims.

The invention claimed is:

1. A clip-type tensioner mechanism comprising:
a housing in which a hole is formed which is open at one end;
a piston which can move in and out of said hole; and
a spring which urges said piston so as to protrude from said hole; and
a ratchet mechanism;
said ratchet mechanism comprising:
a plurality of rack teeth comprising a plurality of first rack teeth and a plurality of second rack teeth, which are formed on the outer periphery of said piston;
a clip member having a circular portion whereof the diameter can be enlarged, which elastically engages with said rack teeth in a diametric direction; and
a recess provided in said housing, having a first face which comes into contact with said clip member when said piston advances, allowing said piston to advance, and a second face which comes into contact with said clip member when said piston retracts, thereby holding said clip member between said rack teeth and restricting retraction of said piston;
said second face being inclined obliquely to the axis of said piston; and
the position on said oblique second face of said recess where said clip member makes contact when said piston has retracted with said clip member in a state of engagement with any of plurality of first rack teeth, is different than the position on said oblique second face of said recess where said clip member makes contact when the abovementioned piston has retracted with said clip member in a state of engagement with any of said plurality of second rack teeth;
wherein wear on said second face is reduced.

2. The clip-type tensioner as claimed in claim 1, wherein said first rack teeth have a first shape, and said second rack teeth have a second shape which is different than said first shape.

3. The clip-type tensioner as claimed in claim 1, wherein the diameter of the bottom of said second rack teeth where said clip member is seated is smaller than the diameter of the bottom of the first rack teeth where said clip member is seated.

4. The clip-type tensioner as claimed in claim 3, wherein said first rack teeth are formed toward the front end of said piston, and said second rack teeth are formed toward the rear end of said piston.

5. The clip-type tensioner as claimed in claim 3, wherein said first rack teeth are formed toward the rear end of said piston, and said second rack teeth are formed toward the front end of said piston.

6. The clip-type tensioner as claimed in claim 1, wherein said rack teeth also comprise a plurality of third rack teeth, and the position on said oblique second face of said recess where said clip member makes contact when said piston has retracted with said clip member in a state of engagement with any of said plurality of third rack teeth, is different than the position on said second face of said recess where said clip member makes contact when said piston has retracted with said clip member in a state of engagement with any of said pluralities of first and second rack teeth.

7. The clip-type tensioner as claimed in claim 1, wherein a cylinder which is open at one end is provided in said hole of said housing, and said piston is slidably supported in said cylinder, with the recess being formed on the inner peripheral surface of said cylinder.

\* \* \* \* \*